Feb. 9, 1932.  W. H. DE LANCEY  1,844,212
VISIBLE DISCHARGE INDICATOR
Filed March 27, 1931   2 Sheets-Sheet 1
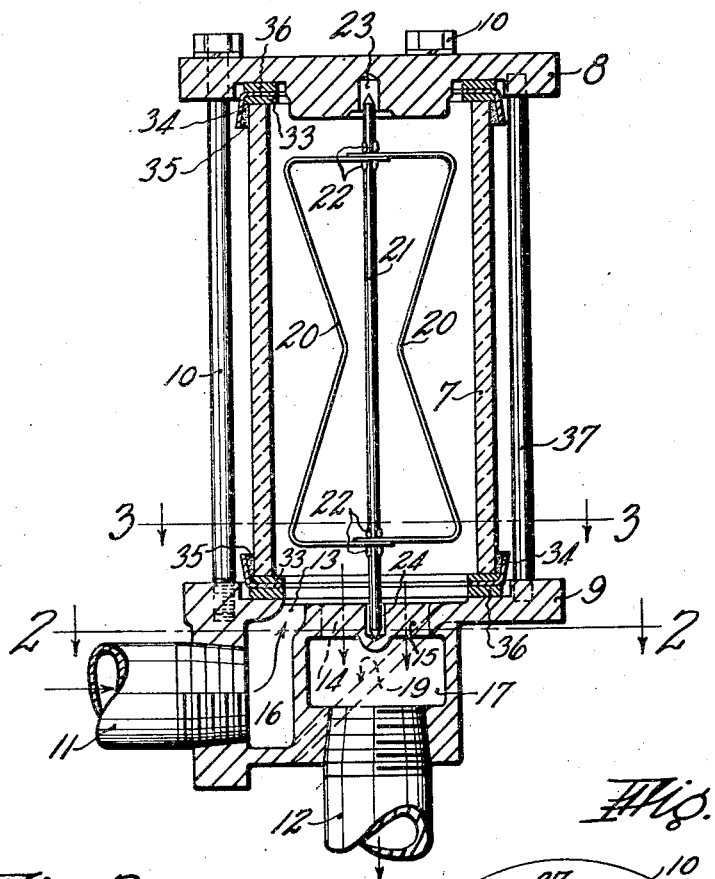
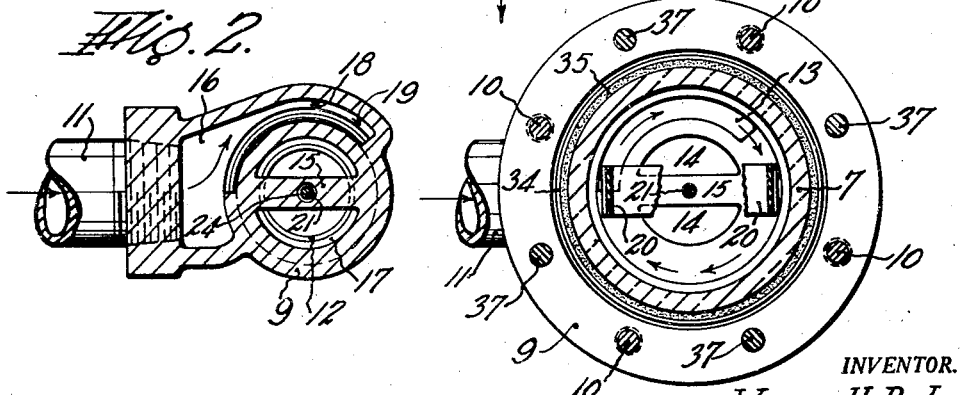
INVENTOR.
WARREN H. DE LANCEY
BY Chapin + Neal
ATTORNEYS.

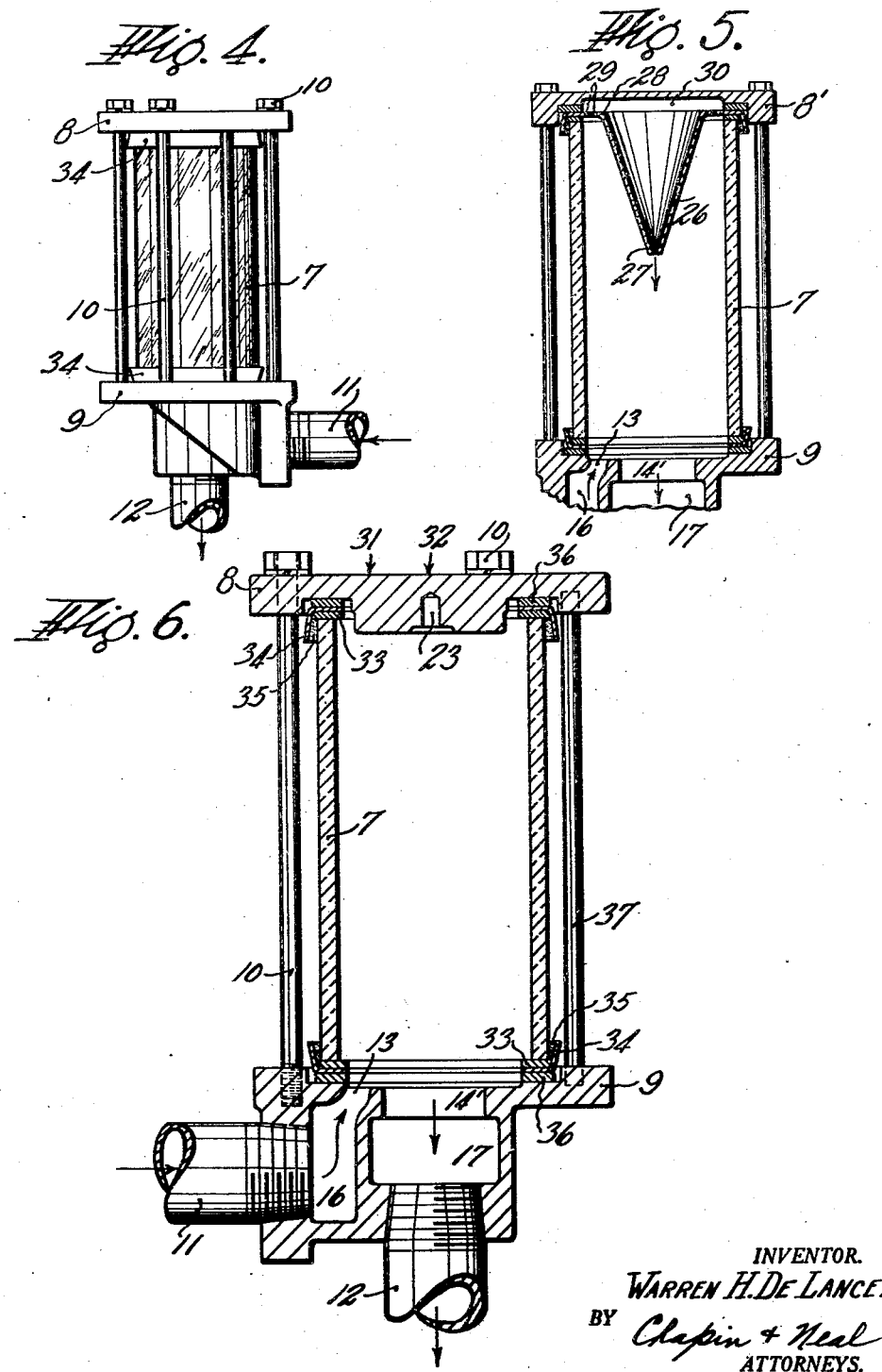

Patented Feb. 9, 1932

1,844,212

UNITED STATES PATENT OFFICE

WARREN H. DE LANCEY, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS

VISIBLE DISCHARGE INDICATOR

Application filed March 27, 1931. Serial No. 525,746.

This invention relates to an improved indicating device for use in the discharge pipe of a liquid dispensing apparatus, such for example as that used for dispensing and measuring gasoline or the like.

The indicating device is of the type comprising a small receptacle through which the liquid discharging from the dispensing apparatus is caused to flow. This receptacle has a transparent wall (usually although not necessarily a glass cylinder held between base and cap members), whereby the purchaser is able to look into the receptacle and observe the conditions existing therein.

Indicating devices of this type are well known in the art and they have been used heretofore in various forms for various purposes. They have been used to show liquid level and the "primed" condition of a dispensing apparatus of the "dry hose" type and to show the "primed" condition of both the apparatus and hose when the apparatus is of the "wet hose" type. They have also been used in conjunction with floats and spinning vanes, which latter show that the liquid in the receptacle is in motion. These vanes or other motion indicating means, are usually desired where the apparatus is of the "wet hose" type for in such case the receptacle is normally completely filled with gasoline and, since gasoline is substantially colorless, the receptacle appears no different when completely filled than when empty. One cannot easily tell whether the receptacle is full or empty. In such case also, the liquid in the receptacle normally appears quiescent and the function of the spinner vane is to prove that the liquid is actually in motion.

When the indicating device is used in a "wet hose" type of apparatus, it is usually placed at the highest point in the discharge line and the inlet and outlet of the receptacle are located in the base thereof for the purpose of showing that the hose and all other parts of the dispensing apparatus are completely filled with gasoline. A leak in the hose or in any other part of the apparatus will manifest itself by a drop in the level of gasoline in the receptacle and this drop in level can be observed by the purchaser through the transparent wall. Where both inlet and outlet are located in the base of the receptacle, it is difficult when the apparatus is initially operated, to force all of the air out of the receptacle. Some traces of air are left in the upper part of the receptacle. While complete removal of the air may be initially effected by opening a vent in the top of the receptacle, it is found in practice that small quantities of air will accumulate in the receptacle at the location mentioned. Such an accumulation of air may not be due to a leak in the system. Gasoline often contains small quantities of air, mixed therewith, and this air becomes separated in the receptacle, rising to the top thereof and gradually accumulating until a substantial amount is shown. Whether the presence of air in the receptacle is due to a leak in the system or to air entrapped in the gasoline, the purchaser naturally assumes that the apparatus is faulty. The fact is that the presence of air in the receptacle may, in many cases, give a false indication of the condition of the apparatus and one unfavorable to the owner of the apparatus.

This invention is directed to and has for its object an improvement in the indicating device which enables the air in the receptacle to be initially and completely removed without venting the top of the receptacle and which thereafter functions to remove air from the upper part of the receptacle as fast as it accumulates, thus preventing the accumulations of air which mislead the purchaser into believing the apparatus is faulty.

More particularly, the invention is characterized by the introduction of the liquid into one end of the receptacle in such a manner that any and all air therein is forced to the center of the receptacle and toward and out through a discharge opening in the same end of the receptacle. The liquid enters the receptacle at one end near the inner peripheral surface of the receptacle and is whirled around and along such surface in a substantially spiral path toward and to its opposite end, where it is turned back and caused to flow in an inside path toward and to the first named end and then out through the central discharge passage therein. A vortex discharge of the liquid is thus created. The air is withdrawn by the suction effect incident to this vortex discharge. The liquid is whirled to create the vortex discharge but the air is withdrawn by suction. As is well known, there is a region of lower pressure in the center of the vortex, whereby a suction effect is set up and this effect is utilized to draw from the receptacle even the last traces of air contained therein, such for example as that contained in small pockets in the inner face of the cap member of the receptacle.

The invention may be used with or without a spinner vane. The action, insofar as removal of air from the receptacle is concerned, is the same in either case. The spinner vane in no way assists in the removal of the air and has no more than its normal function of indicating that the liquid in the receptacle is in motion. But the manner in which the liquid is introduced helps decidedly in rotating the spinner vane and has therefore, another function entirely distinct from that above pointed out.

The above and other objects will more particularly appear as the detailed description proceeds and will be pointed out in the appended claims.

The invention will be disclosed with reference to the accompanying drawings, in which:

Fig. 1 is a sectional elevational view of one form of indicating device embodying the invention;

Figs. 2 and 3 are sectional plan views thereof, taken on the lines 2—2 and 3—3, respectively, of Fig. 1;

Fig. 4 is a small scale exterior elevational view, looking from the back side of Fig. 1; and Figs. 5 and 6 are sectional elevational views showing two other forms of the invention.

Referring first to Figs. 1 to 3 inclusive, the receptacle, conveniently although not necessarily, is of cylindrical form. As herein shown, it includes a glass cylinder 7 and end walls 8 and 9, between which the cylinder is firmly held in any suitable way, as by the tie bolts 10. Liquid is supplied to the receptacle by a pipe 11 and leaves the receptacle by a pipe 12, to which the dispensing hose is usually attached. Pipes 11 and 12 are both connected to one end wall, as 9, the other wall being completely closed. The receptacle, except for its communication with pipes 11 and 12 is completely closed in air tight and liquid tight fashion. As usually used, the receptacle is mounted with its axis vertically disposed and the end walls 8 and 9 become cap and base, respectively, and will be hereinafter so termed. The receptacle is generally located at the highest point in the piping system. Such mounting, however, is not necessarily essential to all uses even though it is the customary mounting for the use with gasoline dispensing equipment.

It will be noted from Fig. 3 that the base 9 has a curved slot 13 therein which is concentric with and lies closely adjacent the inner peripheral surface of the glass cylinder 7. This slot forms the inlet port. The outlet port 14 is centrally arranged in base 9 in axial alignment with cylinder 7 and is of circular form except that it is diametrically spaned by a bridge 15. In base 9 and below ports 13 and 14 are passages 16 and 17, which connect these ports to their respective pipes 11 and 12. The inlet passage 16 is curved partly around the axis of the outlet passage 17 as at 18, and this curving part underlies the curved inlet port 13. Also, this curving part 18 of the inlet passage has a bottom wall which slopes upwardly in a steep incline as at 19, to the level of the inlet port 13. The inlet passage is thus part-spiral in form.

The results of this invention follow from the described shape of the inlet passage and its location relative to the cylinder 9. The liquid entering from pipe 11 under pressure is forced to move in a curved and upwardly ascending path by the parts 18 and 19, respectively, of the inlet passage. The liquid thus started on a spiral path, enters the base of the receptacle through port 13 at a location closely adjacent the inner peripheral surface of cylinder 7 and is deflected by such surface around and around the outer part of the cylinder and, at the same time, travels upwardly toward and to the cap 8. Here the spirally ascending stream of liquid is turned back by cap 8 and caused to descend in a path inside the upwardly flowing stream towards, to and through the central port 14 in the base 9. In this action, the air which originally filled the receptacle is displaced by the entering liquid and, being lighter, is forced to the center of the whirling stream of liquid. The result is a vortex discharge of the liquid through port 13. A veritable whirlpool is created which sucks in the air from the top of the receptacle and causes it to leave through the central discharge passage. When the device is initially operated, the vortex or whirlpool formation of the liquid is clearly visible,—there being a substantial central area in the shape of an inverted cone pointing to and aligned with the outlet port, which area is filled with air. This central cone of air rapidly diminishes and in a very short time entirely disappears, leaving the receptacle entirely filled with liquid in an apparently quiescent condition. But this is not the actual condition because the liquid actually is whirling as before and a region of low pressure exists in the central part of the cylinder, causing the suction effect to continually draw air from the receptacle as fast as it enters. As a consequence, the receptacle is always full of liquid unless there is a leak in the system. Such a leak will still be apparent when the apparatus is stopped, by a drop in the level of the liquid in the receptacle. But the false and misleading indication, heretofore possible, due to the gradual accumulation in the top of the receptacle of air separated from the gasoline with which it had hitherto been entrapped, is no longer possible.

Since, as described, the receptacle is normally completely filled with liquid and its motion is not apparent to the purchaser, it is usually desired to employ a spinner which will be rotated by the liquid and the motion of which will be readily apparent to the purchaser. In Fig. 1 such a spinner is shown. It comprises two strips 20 of thin sheet metal, bent as shown and fixed to a shaft 21, one on each side thereof. These strips are perforated to receive the shaft and are held thereto by squeezing out the metal of the shaft at certain points to form projections 22, in a manner which will be clear from the drawings. The result is a spinner in the form of an hour glass but of skeleton formation,—the thin edge only of the strips 20 being presented to the turning stream of liquid, as will be clear from Fig. 3. This spinner in no sense has any stirring effect. In the first place, it is not constructed so as to effectively stir because of its skeleton construction and the disposition of the thin edge aforesaid. In the second place, it is propelled by the liquid and at the same speed and thus lacks the relative movement necessary for the stirring purpose.

With a spinner vane of such construction, it would be difficult, except for the means of this invention, to impart to it any considerable speed of rotation. But here the liquid is so directed as to act in the most effective way on the spinner to propel it. As a matter of fact, the inlet port 13 shown in Fig. 3 is made of greater arcuate extent than need be from other considerations in order to check the velocity of the spinner vane and keep it from travelling excessively fast.

The spinner shaft 21 is loosely received at its ends in pockets 23 and 24 in the cap and base respectively. The lower end of the shaft is preferably conical and rests on a conical bearing in the bottom of pocket 24. This construction provides for rotatably supporting the spinner with a minimum of friction and enables the spinner to be easily rotated.

The invention, insofar as the removal of air from the receptacle is concerned, is entirely independent of the spinner. Such spinner in no sense helps in the action of removal of the air. While on the other hand it does not materially interfere with such action, the omission of the spinner as shown in Fig. 6, enables the discharge port such as 14' to be truly cylindrical and unobstructed, as it was in Fig. 1 by the bridge 15. Also, the inlet port 13 may be of less arcuate extent than formerly because, in the case of Fig. 1 as above set forth, the port was increased in area to reduce the velocity of the liquid to prevent excess speed of the spinner. The construction of Fig. 6 is identical with that of Fig. 1 except for the omission of the spinner and bridge 15. The operation is exactly the same as above described.

In Fig. 5, a third form of the invention is disclosed. The construction here is the same as in Fig. 6 except for a slightly different form of cap, marked 8', and except for the interposition between the end of the cylinder 7 and cap 8' of a shield 26 in the form of a hollow inverted cone. The conical part of the shield has a central outlet 27 of small area at its lower and pointed end. The upper and larger end of the conical shield has an outwardly turned annular flange 28 by which it is supported, and there are a series of holes 29 in this flange allowing liquid and air to pass through the flange into a pocket 30 formed in cap 8'. The operation of this form of the invention is substantially the same as that heretofore described but the action can perhaps be better visualized and its true nature better understood. The liquid whirling in an upwardly ascending substantially spiral stream around the inner surface of cylinder 9 will be turned back by the flange 28 and cone 26 and caused to travel downwardly to and through the outlet 14', forming a vortex or whirlpool discharge as formerly. Some of the air will be driven through the holes 29 into pocket 30 and such air as well as all that which originally filled the pocket and all that inside the cone 26, will be drawn out through outlet 27 by the suction effect of the whirlpool created. While the action is essentially no different than before, the cone 26 presents a tangible and visible partition between the air and liquid areas of the receptacle as they would exist at one point in the initial operation of the device. In such operation and at one point thereof, a cone of air will be formed comparable in volume and location to that within cone 26. In each case (with or without the shield 26) the conical volume of air, even to the last trace, is removed, and by the same means, viz., the suction effect of the whirlpool.

The construction of Fig. 6 demonstrates that whirling of the air with the liquid is not essential to the removal of the air, or at least the last traces of air in the upper part of the receptacle. That air within the cone 26 or pocket 30, or even the pocket 23 of Fig. 6, will not be whirled by the liquid. Yet it is removed. Any whirling of the air, if it does occur because of the whirl of the liquid, has no useful purpose. That the invention does not depend on or utilize whirling of the air for the purpose of effecting its removal will be clear from Fig. 5. Also, in the case of Fig. 6, the last trace of air to be removed from the receptacle is that contained in pocket 23. Such air will not be whirled by the whirling liquid. It will, however, be sucked out due to the low pressure existing at the center of the vortex. The true action,—removal of the last vestige of air from the top of the receptacle because of the suction effect of the vortex or whirlpool discharge of the liquid,—can further be demonstrated by attaching pressure gages at the locations shown by the arrows 31 and 32 in Fig. 6. The gage at 32 will show a lower pressure than that at 31, while the device is in operation. In short, the whirling of the liquid is the only thing desired and this is desired solely to create a whirlpool discharge, whereby the suction effect of the whirlpool may be utilized to suck out air from the receptacle as fast as it accumulates.

The details of the exemplary apparatus are not particularly important. Such as have not already been described need be no more than briefly explained. The glass cylinder, at each end, rests upon a gasket 33 set in a metal ferrule 34 and is sealed in place by litharge 35. Between each ferrule 34 and the adjacent end walls 8 and 9, as the case may be, is another gasket 36. The tie bolts 10 clamp the end walls 8 and 9 against the gaskets 36 and form a tight joint therebetween. The parts marked 37 are dummy rods which supplement the protection afforded by bolts 10 against breakage of the glass cylinder.

It is recognized that the invention may be practiced in various embodiments differing specifically from those herein disclosed, and it is not the intention to limit the invention to any details of the within disclosure, except insofar as they are made a part of the appended claims.

What I claim is:

1. In a device of the class described, a receptacle in part of transparent material and having a wall substantially annular in cross sectional form and closed at both ends, one end having a substantially central outlet, the axis of which substantially parallels that of said annular wall, and means for introducing liquid through such end and directing it into the receptacle in a path such that the liquid tends to discharge through said outlet in whirlpool fashion, thereby creating a suction effect to draw from the receptacle any and all air that may be present therein.

2. In a device of the class described, a receptacle in part of transparent material and having a wall substantially annular in cross sectional form and closed at both ends, one end having a substantially central outlet the axis of which substantially parallels that of said annular wall, and means for introducing liquid through such end in a stream which advances toward the other end and at the same time whirls around said wall, said whirling advancing stream forcing air if present in said receptacle toward the axis of the latter, said last named end turning said stream toward the first named end and causing it to flow inside the advancing part to and through said outlet forming a whirlpool which sucks all air from the receptacle.

3. In a device of the class described, a receptacle in part of transparent material and having a wall substantially annular in cross sectional form and closed at both ends, one end having a substantially central outlet the axis of which substantially parallels that of said annular wall, and means for introducing liquid through such end, and causing it to whirl around the curved surface of such wall and at the same time to advance along the same to the other end in an outside path adjacent said wall, said last named end serving to turn the whirling liquid and direct it in an inside path toward the first named end and to and through said outlet, whereby the liquid is discharged through said outlet in a vortex.

4. In a device of the class described, a receptacle in part of transparent material, said receptacle having a wall of substantially annular cross section closed at its upper end and a base wall on which the first wall is supported in upstanding relation and by which its lower end is closed, said base wall having an outlet substantially in axial alignment with the first wall, and means for introducing liquid into the receptacle through the base wall and for directing the liquid in a path such that it tends to discharge in whirlpool fashion through said outlet.

5. In a device of the class described, a receptacle in part of transparent material, said receptacle having a wall of substantially annular cross section closed at its upper end and a base wall on which the first wall is supported in upstanding relation and by which its lower end is closed, said base wall having an outlet substantially in axial alignment with the first wall, and means for introducing liquid into the receptacle through the base wall and for directing the liquid in a path such that it whirls around the first named wall in an upwardly advancing stream, said upper end turning the whirling stream downwardly in a path inside the ascending stream toward said outlet, whereby the liquid discharges vortex fashion through the outlet and any air in the receptacle is drawn out through the outlet by the suction effect of the vortex.

6. A device of the class described, comprising, a base, a hollow member of substantially annular cross section and at least in part of transparent material, said member closed at one end and at its other end mounted upon said base, said base having inlet and outlet passages therein in communication with the space within said member, said outlet passage located substantially in axial alignment with said member, said inlet passage sloping upwardly on an incline in the direction of liquid flow and opening into said space at a point closely adjacent said wall and near the lower end thereof.

7. A device of the class described, comprising, a base, a hollow member of substantially annular cross section and at least in part of transparent material, said member closed at one end and at its other end mounted upon said base, said base having inlet and outlet passages therein in communication with the space within said member, said outlet passage located substantially in axial alignment with said member, said inlet passage curving partly around the outlet passage and extending upwardly in the direction of liquid flow in substantially the form of a portion of a helix and opening into the lower end of the hollow member at a point closely adjacent the inner peripheral surface thereof.

8. In a device of the class described, a receptacle in part of transparent material and having a wall of substantially annular cross section closed at one end, a member connected to the other end of said wall and having inlet and outlet passages therein communicating with the space within said wall, said receptacle except for said passages being entirely closed, said inlet passage opening into said space at a point closely adjacent the rounded surface of said wall and constructed to cause the entering liquid to whirl around said wall, and a spinner rotatably supported within the receptacle and having parts located in the path of the entering whirling liquid.

9. In a device of the class described, a receptacle in part of transparent material and having a wall of substantially annular cross section closed at one end, a member connected to the other end of said wall and having inlet and outlet passages therein communicating with the space within said wall, said receptacle except for said passages being entirely closed, said inlet passage opening into said space at a point closely adjacent the rounded surface of said wall and constructed to cause the entering liquid to whirl around said wall, and a spinner of skeleton formation supported within the receptacle for rotation about the axis of said wall and located in the path of the whirling entering liquid.

In testimony whereof I have affixed my signature.

WARREN H. DE LANCEY.